E. HEYDON.
PIPE JOINT.
APPLICATION FILED MAR. 11, 1915.
1,246,427.
Patented Nov. 13, 1917.
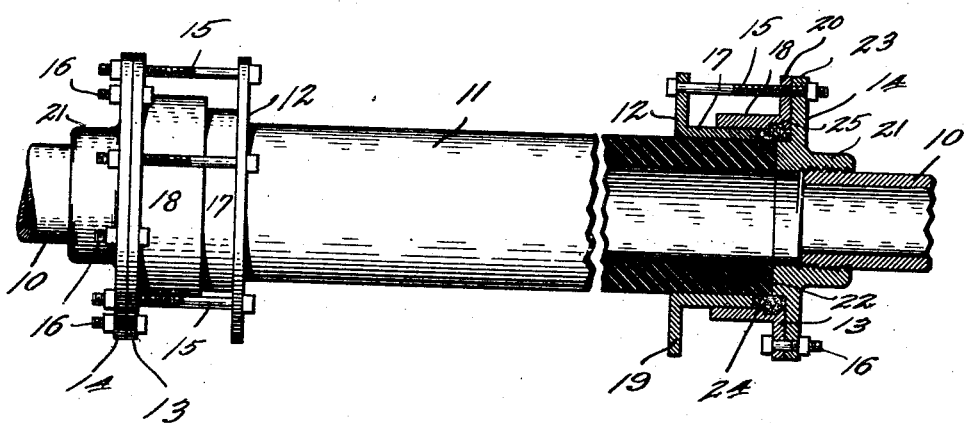
WITNESSES:
Frank A. Fahle
Josephine Gasper
INVENTOR
Edward Heydon,
BY
Hood & Schley.
ATTORNEYS.

UNITED STATES PATENT OFFICE.

EDWARD HEYDON, OF INDIANAPOLIS, INDIANA.

PIPE-JOINT.

1,246,427. Specification of Letters Patent. Patented Nov. 13, 1917.

Application filed March 11, 1915. Serial No. 13,631.

*To all whom it may concern:*

Be it known that I, EDWARD HEYDON, a citizen of the United States, residing at Indianapolis, in the county of Marion and State of Indiana, have invented a new and useful Pipe-Joint, of which the following is a specification.

My invention relates to insulating joints for pipes, and particularly for underground pipes of fairly large size.

The object of my invention is to provide an insulating joint which can readily be placed in pipes or mains which have already been laid, without requiring the pipe as a whole to be taken up, and which will give good insulation and will not deteriorate by reason of the chemical action of the earth in which it is buried.

The accompanying drawing illustrates my invention. The single figure of this drawing is a partial elevation and partial central longitudinal section through an insulating joint embodying my invention, together with fragments of the adjacent pipe ends.

The two pipe ends 10 are very frequently originally parts of one pipe already laid in the ground before the insulating joint is placed in position, and when it is decided to place the insulating joint in the pipe a section of this pipe 10 is cut out to provide a gap of proper length for the insulating joint.

This insulating joint comprises a porcelain tube 11 which is slightly shorter than the gap in the pipe 10. On each end of the porcelain tube 11 is a fitting composed of three metal parts 12, 13, and 14 fastened together by bolts 15 and 16. The part 12 has a tubular portion 17 which has a close sliding fit on the end of the porcelain tube 11, and the part 13 has a tubular portion 18 which has a close sliding fit on the outside of the tubular portion 17, the portions 17 and 18 being respectively provided at one end with outwardly projecting flanges 19 and 20. The part 14 has a central tubular portion 21, which at one end is internally threaded to fit on the threaded pipe end 10 and at the other is provided with a shoulder 22 for abutting against the end of the porcelain tube 11, and from an intermediate part on this tubular portion 14 a flange 23 projects outward and fits against the flange 20 of the part 13. The flanges 20 and 23 are firmly clamped together by the bolts 16, of which there are any desired number, and the flange 19 of the part 17 is drawn toward the flanges 20 and 23 by the bolts 15, which conveniently alternate with the bolts 16 around the flanges. The tubular portion 17 projecting into the tubular portion 18 does not reach quite to the flange 23, but leaves a space over the abutting joint between the end of the insulating tube 11 and the shoulder 22 for receiving a suitable packing 24, which is compressed as the nuts on the bolts 15 are tightened to draw the tubular portion 17 more closely toward the flange 14. This compression of the packing 24 binds the parts firmly on the end of the insulating tube 11 and forms a tight joint which effectually prevents leakage. In order to keep the packing from being forced down between the shoulder 22 and the end of the insulating tube 11, the tubular portion 18 is provided with an inner circumferential recess 25 directly opposite such joint. This recess allows the packing 24 to bulge outwardly under the compression to which it is subjected, instead of being pushed inward into such joint.

In installing my insulating joint, a piece of the pipe 10 of proper size is first cut out, and the ends of the remaining parts of such pipe are threaded while in place in the ground. When the two parts 21 of the fittings for the two ends of the insulating joint are screwed upon these pipe ends 10, until the shoulders 22 of such two parts are at the proper distance apart to receive between them the insulating tube 11. Then the insulating tube, with the parts 12 and 13 of a fitting loosely mounted on each end, is slid into position between such two shoulders 22, corresponding flanges 20 and 23 are clamped together by the bolts 16, the packing 24 is put in place in each fitting, and then the flanges 19 are fastened to the corresponding flanges 20 and 23 by the bolts 15, and the part 12 of each fitting is drawn by the bolts 15 toward the part 14 to compress the packing 24.

I claim as my invention:

1. In a pipe joint, the combination of a tube, a member having a sliding fit on the end of such tube, a second member having a sliding fit on the first member, a third member separable from the first two members and provided with means for attaching it to a pipe, means for attaching the second and third members together, means for forcing the first member along the pipe inside the second member, and a packing within the second member and compressed by such sliding of the first member, said third member abutting against the end of the tube and said second member being provided with an inner circumferential groove over such abutting joint.

2. In a pipe joint, the combination of a tube, a member having a sliding fit on the end of such tube, a second member having a sliding fit on the first member, a third member separable from the first two members and provided with means for attaching it to a pipe independently of the first two members, means for attaching the second and third members together, means for forcing the first member along the pipe inside the second member, and a packing within the second member and abutting against said third member and compressed by such sliding of the first member.

3. In a pipe joint, the combination of a tube, and an attaching fitting on the end of such tube, said attaching fitting comprising a member having a close sliding fit on the tube, a second member having a close sliding fit on the first member, a third member which abuts against the end of the tube and is provided with means for attaching it to a pipe, each of said three members having outwardly projecting flanges, bolts for attaching together the flanges of the second and third members, bolts for drawing the flange of the first member toward the flanges of the second and third members, and a packing which is located within the second member and over the joint between the tube in the third member so as to be compressed by the tightening of said last-named bolts, said second member having an inner circumferential groove over the joint between the tube and the third member.

4. In a pipe joint, the combination of a tube, and an attaching fitting on the end of such tube, said attaching fitting comprising a member having a close sliding fit on the tube, a second member having a close sliding fit on the first member, a third member which abuts against the end of the tube and is provided with means for attaching it to a pipe, each of said three members having outwardly projecting flanges, bolts for attaching together the flanges of the second and third members, bolts for drawing the flange of the first member toward the flanges of the second and third members, and a packing which is located within the second member and over the joint between the tube in the third member so as to be compressed by the tightening of the said last-named bolts.

5. In a pipe joint, the combination of a tube, and an attaching fitting on the end of said tube, said fitting comprising a part which is provided with means for attachment to a pipe and abuts against the end of the tube and has a tubular projection surrounding the tube end but spaced therefrom, and a second part which has a tubular portion fitting slidingly on the pipe and into the tubular portion of the first part, a packing which is located within the space within the tubular portion of the first part and around the end of the tube, and means for drawing the second part toward the end of the tube to compress such packing.

6. In a pipe joint, the combination of an insulated tube, a member having a sliding fit on the end of such tube, a second member having a sliding fit on the first member, a third member separable from the first two members and provided with means for attaching it to a pipe, means for attaching the second and third members together, means for forcing the first member along the pipe inside the second member, and a packing within the second member and compressed by such sliding of the first member, said third member abutting against the end of the tube and said second member being provided with an inner circumferential groove over such abutting joint.

7. In a pipe joint, the combination of an insulated tube, a member having a sliding fit on the end of such tube, a second member having a sliding fit on the first member, a third member separable from the first two members and provided with means for attaching it to a pipe, means for attaching the second and third members together, means for forcing the first member along the pipe inside the second member, and a packing within the second member and compressed by such sliding of the first member.

8. In a pipe joint, the combination of an insulated tube, and an attaching fitting on the end of such tube, said attaching fitting comprising a member having a close sliding fit on the tube, a second member having a close sliding fit on the first member, a third member which abuts against the end of the tube and is provided with means for attaching it to a pipe, each of said three members having outwardly projecting flanges, bolts for attaching together the flanges of the second and third members, bolts for drawing the flange of the first member toward the flanges of the second and third members, and a packing which is located within the second member and over the joint between the tube in the third member so as to be compressed by the tightening of said last-named bolts, said second member having an inner circumferential groove over the joint between the tube and the third member.

9. In a pipe joint, the combination of an insulated tube, and an attaching fitting on the end of such tube, said attaching fitting comprising a member having a close sliding fit on the tube, a second member having a close sliding fit on the first member, a third member which abuts against the end of the tube and is provided with means for attaching it to a pipe, each of said three members having outwardly projecting flanges, bolts for attaching together the flanges of the second and third members, bolts for drawing the flange of the first member toward the flanges of the second and third members, and a packing which is located within the second member and over the joint between the tube in the third member so as to be compressed by the tightening of said last-named bolts.

10. In a pipe joint, the combination of an insulated tube, and an attaching fitting on the end of said tube, said fitting comprising a part which is provided with means for attachment to a pipe and abuts against the end of the tube and has a tubular projection surrounding the tube end but spaced therefrom, and a second part which has a tubular portion fitting slidingly on the pipe and into the tubular portion of the first part, a packing which is located within the space within the tubular portion of the first part and around the end of the tube, and means for drawing the second part toward the end of the tube to compress such packing.

In witness whereof, I have hereunto set my hand at Indianapolis, Indiana, this ninth day of March, A. D. one thousand nine hundred and fifteen.

EDWARD HEYDON.

Witnesses:
JOSEPHINE GASPER,
G. B. SCHLEY.

Copies of this patent may be obtained for five cents each, by addressing the "Commissioner of Patents, Washington, D. C."